US012627224B2

(12) United States Patent
Yang et al.

(10) Patent No.: US 12,627,224 B2
(45) Date of Patent: May 12, 2026

(54) RESONANT POWER CONVERTOR AND CONTROL METHOD THEREOF

(71) Applicant: Richtek Technology Corporation, Zhubei City (TW)

(72) Inventors: Ta-Yung Yang, Taoyuan City (TW); Yu-Chang Chen, Jiji Township, Nantou County (TW); Kuo-Chi Liu, Hsinchu City (TW); Tzu-Chen Lin, Zhubei City (TW)

(73) Assignee: RICHTEK TECHNOLOGY CORPORATION, Zhubei City (TW)

( * ) Notice: Subject to any disclaimer, the term of this patent is extended or adjusted under 35 U.S.C. 154(b) by 202 days.

(21) Appl. No.: 18/782,603

(22) Filed: Jul. 24, 2024

(65) Prior Publication Data

US 2025/0202351 A1 Jun. 19, 2025

Related U.S. Application Data

(60) Provisional application No. 63/609,904, filed on Dec. 14, 2023.

(30) Foreign Application Priority Data

May 6, 2024 (TW) ................................. 113116723

(51) Int. Cl.
| | |
|---|---|
| *H02M 3/00* | (2006.01) |
| *H02M 1/38* | (2007.01) |
| *H02M 3/335* | (2006.01) |
| *H02M 7/48* | (2007.01) |

(52) U.S. Cl.
CPC ........... *H02M 3/015* (2021.05); *H02M 1/385* (2021.05); *H02M 3/33571* (2021.05); *H02M 7/4815* (2021.05)

(58) Field of Classification Search
CPC . H02M 3/015; H02M 3/33571; H02M 7/4815
See application file for complete search history.

(56) References Cited

U.S. PATENT DOCUMENTS

| | | | |
|---|---|---|---|
| 8,369,110 B2 * | 2/2013 | Nakanishi | H02M 1/36 363/21.03 |
| 2018/0183343 A1 * | 6/2018 | Ausseresse | H02M 3/3376 |
| 2019/0386558 A1 * | 12/2019 | Drda | H02M 1/32 |
| 2021/0067046 A1 * | 3/2021 | Adragna | H02M 1/08 |

* cited by examiner

*Primary Examiner* — Gary A Nash
(74) *Attorney, Agent, or Firm* — McClure, Qualey & Rodack, LLP

(57) ABSTRACT

A resonant power converter includes a resonant capacitor, a transformer, a high-side transistor, a low-side transistor, a divider, a full-wave rectification device, a control circuit, and a rectifying circuit. The resonant capacitor is coupled between a resonant node and a ground. The transformer includes a primary coil coupled between a switch node and the resonant node and a secondary coil. The high-side transistor provides an input voltage to the switch node and the low-side transistor couples the switch node to the ground. The divider divides a voltage of the resonant node to generate a divided signal. The full-wave rectification device full-wave rectifies the divided signal to generate a full-wave rectified signal. The control circuit compares the full-wave rectified signal to a feedback voltage related to an output voltage to drive the high-side transistor and the low-side transistor. The rectifying circuit generates the output voltage.

22 Claims, 11 Drawing Sheets

400

700

RESONANT POWER CONVERTOR AND CONTROL METHOD THEREOF

CROSS REFERENCE TO RELATED APPLICATIONS

This application claims the benefit of U.S. Provisional Application No. 63/609,904, filed on Dec. 14, 2023, the entirety of which is incorporated by reference herein.

This application claims priority of Taiwan Patent Application No. 113116723, filed on May 6, 2024, the entirety of which is incorporated by reference herein.

BACKGROUND OF THE INVENTION

Field of the Invention

The present invention is generally related to a resonant power convertor and a control method thereof, and more particularly it is related to a resonant power convertor and a control method thereof, for controlling the high-side transistor and the low-side transistor by comparing the full-wave rectified signal generated by full-wave rectifying a signal related to a voltage across the resonant capacitor with the feedback signal.

Description of the Related Art

With the continuous advancements being made in portable electronic devices, the development of power conversion circuits, like most power products, is trending in the direction of high efficiency, high power density, high reliability, and low cost. Since the resonant power convertor (including LLC resonant power convertor, etc.) has the advantages of achieving zero-voltage switching (ZVS) on the primary side and zero-current switching (ZCS) of the rectifier diode on the secondary side within the full load range, causing the duty cycle of the high-side and low-side transistors to both be 50% by frequency control, no output inductor required, using low-voltage transistors on the secondary side leading to cost reductions and efficiency improvements, the resonant power convertor has been increasingly used for DC voltage conversion in recent years.

The duty cycles of the high-side transistor and the low-side transistor are not both 50%, however. The current transmitted to the secondary side is uneven and the conversion efficiency is reduced. Therefore, it is necessary to improve the balance between the duty cycles of the high-side transistor and the low-side transistor.

BRIEF SUMMARY OF THE INVENTION

In an embodiment, a resonant power converter is provided. The resonant power converter comprises a resonant capacitor, a transformer, a high-side transistor, a low-side transistor, a first voltage divider, a full-wave rectification device, a control circuit, a rectifying circuit, and a feedback circuit. The resonant capacitor is coupled between a resonant node and a ground. The transformer comprises a primary coil and a secondary coil, wherein the primary coil is coupled between a switch node and the resonant node. The high-side transistor provides an input voltage to the switch node based on a high-side driving signal. The low-side transistor couples the switch node to the ground based on a low-side driving signal. The first voltage divider divides a voltage of the resonant node to generate a voltage-divided signal. The full-wave rectification device full-wave rectifies the voltage-divided signal to generate a full-wave rectified signal. The control circuit compares the full-wave rectified signal to a feedback voltage to generate the high-side driving signal and the low-side driving signal. The rectifying circuit is coupled to the secondary coil and converts a current flowing through the secondary coil into an output voltage. The feedback circuit generates the feedback voltage based on the output voltage.

According to an embodiment of the present invention, the full-wave rectification device uses a basic voltage as a DC level and full-wave rectifies the voltage-divided signal to generate the full-wave rectified signal. The basic voltage is equal to a sum of a divided voltage and an offset voltage. The divided voltage is equal to the input voltage multiplied by a first ratio. The full-wave rectification device further compares the full-wave rectified signal with a first threshold voltage to generate a crossover signal. The first threshold voltage slightly exceeds the basic voltage.

According to an embodiment of the present invention, when the full-wave rectified signal is less than the first threshold voltage, the full-wave rectification device sets the crossover signal to a disabled state. When the full-wave rectified signal is not less than the first threshold voltage, the full-wave rectification device sets the crossover signal to an enabled state. In response to the crossover signal changing from the disabled state to the enabled state, the control circuit sets a phase signal to the enabled state. In response to the full-wave rectified signal exceeding the feedback voltage, the control circuit sets the phase signal to the disabled state based on a high-side dead time signal or a low-side dead time signal. The high-side dead time signal controls a high-side dead time of the high-side driving signal. The low-side dead time signal controls a low-side dead time of the low-side driving signal.

According to an embodiment of the present invention, when the high-side driving signal turns on the high-side transistor and the phase signal is in the enabled state, the control circuit disables the high-side driving signal in response to the full-wave rectified signal exceeding the feedback voltage. When the high-side signal turns off the high-side transistor, the control circuit enables the low-side driving signal to turn on the low-side transistor after the low-side dead time. When the low-side driving signal turns on the low-side transistor and the phase signal is in the enabled state, the control circuit disables the low-side driving signal in response to the full-wave rectified signal exceeding the feedback voltage. When the low-side driving signal turns off the low-side transistor, the control circuit enables the high-side driving signal to turn on the high-side transistor after the high-side dead time.

According to an embodiment of the present invention, the control circuit further limits an enable period of the high-side driving signal and an enable period of the low-side driving signal to no greater than a maximum enable period.

According to an embodiment of the present invention, the offset voltage is determined based on a difference between an enable period of the high-side driving signal and an enable period of the low-side driving signal. The offset voltage is configured to adjust the enable period of the high-side driving signal and the enable period of the low-side driving signal so that the enable period of the high-side driving signal is close to the enable period of the low-side driving signal.

According to an embodiment of the present invention, the resonant power converter further comprises a second voltage divider. The second voltage divider is configured to divide the input voltage to generate the divided voltage. The full-wave rectification device comprises a first resistor, a first current source, and an automatic adjustment circuit. The first resistor is coupled between the divided voltage and the basic voltage, wherein a voltage across the first resistor generates the offset voltage. The first current source provides a first current flowing to the basic voltage. The automatic adjustment circuit sinks an adjustment current from the basic voltage based on the high-side driving signal, the low-side driving signal, the high-side dead time signal, and the low-side dead time signal.

According to an embodiment of the present invention, in response to the first current exceeding the adjustment current, the offset voltage is positive and the basic voltage exceeds the divided voltage. In response to the first current being less than the adjustment current, the offset voltage is negative and the basic voltage is less than the divided voltage. In response to the first current being equal to the adjustment current, the basic voltage is equal to the divided voltage.

According to an embodiment of the present invention, the automatic adjustment circuit comprises a time-to-voltage conversion circuit. The time-to-voltage conversion circuit is configured to respectively convert an enable period of the high-side driving signal and an enable period of the low-side driving signal into a high-side enable-period voltage and a low-side enable-period voltage. The time-to-voltage conversion circuit comprises a second current source, a first switch, a second switch, a first capacitor, a second capacitor, a third capacitor, a third switch, and a fourth switch. The second current source provides a second current. The first switch provides the second current to a charge node based on the high-side driving signal or the low-side driving signal being enabled. The second switch couples the charge node to the ground in the high-side dead time and the low-side dead time. The first capacitor is coupled between the charge node and the ground. The second capacitor is coupled between a high-side enable-period voltage and the ground. The third capacitor is coupled between a low-side enable-period voltage and the ground. The third switch couples the charge node to the high-side enable-period voltage based on the high-side driving signal being enabled. The fourth switch couples the charge node to the low-side enable-period voltage based on the low-side driving signal being enabled. The high-side enable-period voltage represents the enable period of the high-side driving signal, and the low-side enable-period voltage represents the enable period of the low-side driving signal.

According to an embodiment of the present invention, the automatic adjustment circuit further comprises a comparison circuit, a plurality of registers, a counter, and a digital-to-analog converter. The comparison circuit compares the high-side enable-period voltage to the low-side enable period to generate an up-count signal and a down-count signal. The registers are configured to latch the up-count signal and the down-count signal in the high-side dead time and the low-side dead time. The counter up-counts a digital code based on the up-count signal being enabled and down-counting the digital code based on the down-count signal being enabled. The digital-to-analog converter generates the adjustment current based on the digital code. When the high-side enable-period voltage exceeds the low-side enable-period voltage, the comparison circuit enables the up-count signal and disables the down-count signal. When the high-side enable-period voltage does not exceed the low-side enable-period voltage, the comparison circuit disables the up-count signal and enables the down-count signal.

According to an embodiment of the present invention, in response to the output voltage increasing, the feedback voltage decreases. In response to the feedback voltage being less than a low-power threshold voltage, a low-side dead time signal enables a burst signal, so that the control circuit operates in a burst mode based on the burst signal being enabled. When the control circuit operates in the burst mode, the high-side transistor and the low-side transistor are turned off. A duration of the burst mode increases as output power of the output voltage decreases.

According to an embodiment of the present invention, the control circuit comprises a first amplifier, a second amplifier, a second resistor, an N-type transistor, and a current mirror. The first amplifier comprises a first positive input terminal, a first negative input terminal, and a first output terminal, wherein the first positive input terminal receives the feedback voltage, and the first negative input terminal coupled to the first output terminal. The second amplifier comprises a second positive input terminal, a second input terminal, and a second output terminal, wherein the second positive input terminal receives a feedback threshold voltage. The second resistor is coupled between the second negative input terminal and the first output terminal and generating a difference current. The N-type transistor comprises a gate terminal, a drain terminal, and a source terminal, wherein the gate terminal is coupled to the second output terminal and the source terminal is coupled to the second negative input terminal. The current mirror maps the difference current to a mapping current. The feedback threshold voltage is a lower limit of the feedback voltage. The mapping current is configured to adjust the duration.

In another embodiment, a control method configured to control a resonant power converter is provided. The resonant power converter comprises a resonant capacitor coupled between a resonant node and a ground, a transformer comprising a primary coil and a secondary coil, a high-side transistor providing an input voltage to a switch node, a low-side transistor coupling the switch node to the ground, a rectifying circuit converting a current flowing through the secondary coil into an output voltage, and a feedback circuit generating a feedback voltage based on the output voltage. The primary coil is coupled between the switch node and the resonant node. The control method comprises the following steps. A voltage across the resonant capacitor is divided to generate a voltage-divided signal by using a first voltage divider. The voltage-divided signal is full-wave rectified to generate a rectified a full-wave rectified signal. The full-wave rectified signal is compared with the feedback voltage to drive the high-side transistor and the low-side transistor.

According to an embodiment of the present invention, the control method further comprises the following steps. The voltage-divided signal is full-wave rectified with a basic voltage as a DC level to generate the full-wave rectified signal. The full-wave rectified signal is compared with a first threshold voltage to generate a crossover signal. The basic voltage is equal to a sum of a divided voltage and an offset voltage. The divided voltage is equal to the input voltage multiplied by a first ratio. The first threshold voltage is slightly greater than the basic voltage.

According to an embodiment of the present invention, the control method further comprises the following steps. When the full-wave rectified signal is less than the first threshold voltage, the crossover signal is set to a disabled state. When the full-wave rectified signal is not less than the first threshold voltage, the crossover signal is set to an enabled state. In response to the crossover signal changing from the disabled state to the enabled state, a phase signal is set to the enabled state. In response to the full-wave rectified signal exceeding the feedback voltage, the phase signal is set to the disabled state in a high-side dead time or a low-side dead time. The low-side dead time is a period between the point at which the high-side transistor is turned off and the point at which the low-side transistor is turned on. The high-side dead time is a period between the point at which the low-side transistor is turned off and the point at which the high-side transistor is turned on.

According to an embodiment of the present invention, the control method further comprises the following steps. When the high-side transistor is turned on and the phase signal is in the enabled state, the high-side transistor is turned off in response to the full-wave rectified signal exceeding the feedback voltage. When the high-side transistor is turned off, the low-side transistor is turned on after the low-side dead time. When the low-side transistor is turned on and the phase signal is in the enabled state, the low-side transistor is turned off in response to the full-wave rectified signal exceeding the feedback voltage. When the low-side transistor is turned off, the high-side transistor is turned on after the high-side dead time.

According to an embodiment of the present invention, the control method further comprises the following steps. An enable period of the high-side transistor and an enable period of the low-side transistor are limited so as not to exceed a maximum enable period.

According to an embodiment of the present invention, the control method further comprises the following steps. The offset voltage is determined based on a difference between an enable period of the high-side transistor and an enable period of the low-side transistor. The offset voltage is configured to adjust the enable period of the high-side transistor and the enable period of the low-side transistor so that the enable period of the high-side transistor is close to the enable period of the low-side transistor.

According to an embodiment of the present invention, the control method further comprises the following steps. The offset voltage is generated by using a voltage across a first resistor, wherein the first resistor is coupled between the divided voltage and the basic voltage. A first current flowing to the basic voltage is provided. An adjustment current is sunk from the basic voltage based on the high-side transistor and the low-side transistor being turned on and off, the high-side dead time, and the low-side dead time by using an automatic adjustment circuit. The offset voltage is positive and the basic voltage exceeds the divided voltage in response to the first current exceeding the adjustment current. The offset voltage is negative and the basic voltage does not exceed the divided voltage in response to the first current not exceeding the adjustment current. The first current is equal to the adjustment current, and the basic voltage is equal to the divided voltage.

According to an embodiment of the present invention, the step of sinking the adjustment current from the basic voltage based on the high-side transistor and the low-side transistor being turned on and off, the high-side dead time, and the low-side dead time by using the automatic adjustment circuit further comprises the following steps. An enable period of the high-side transistor is converted into a high-side enable-period voltage by using a time-to-voltage conversion circuit. An enable period of the low-side transistor is converted into a low-side enable-period voltage by using the time-to-voltage conversion circuit. The high-side enable-period voltage and the low-side enable-period voltage are compared to generate an up-count signal and a down-count signal. When the high-side enable-period voltage exceeds the low-side enable-period voltage, the adjustment voltage is increased. When the high-side enable-period voltage does not exceed the low-side enable-period voltage, the adjustment voltage is decreased.

According to an embodiment of the present invention, the control method further comprises the following steps. In response to the feedback voltage being less than a low-power threshold voltage, the resonant power converter is operated in a burst mode, wherein the feedback voltage decreases as the output voltage increases. The high-side transistor and the low-side transistor are simultaneously turned off in the burst mode. A duration of the burst mode is increased in response to output power of the output voltage decreasing.

According to an embodiment of the present invention, the control method further comprises the following steps. The feedback voltage is limited so as not to exceed a feedback threshold voltage. A difference current is generated by using a second resistor, the feedback voltage, and the feedback threshold voltage. The difference current is mapped to a mapping current. The duration is adjusted by using the mapping current.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
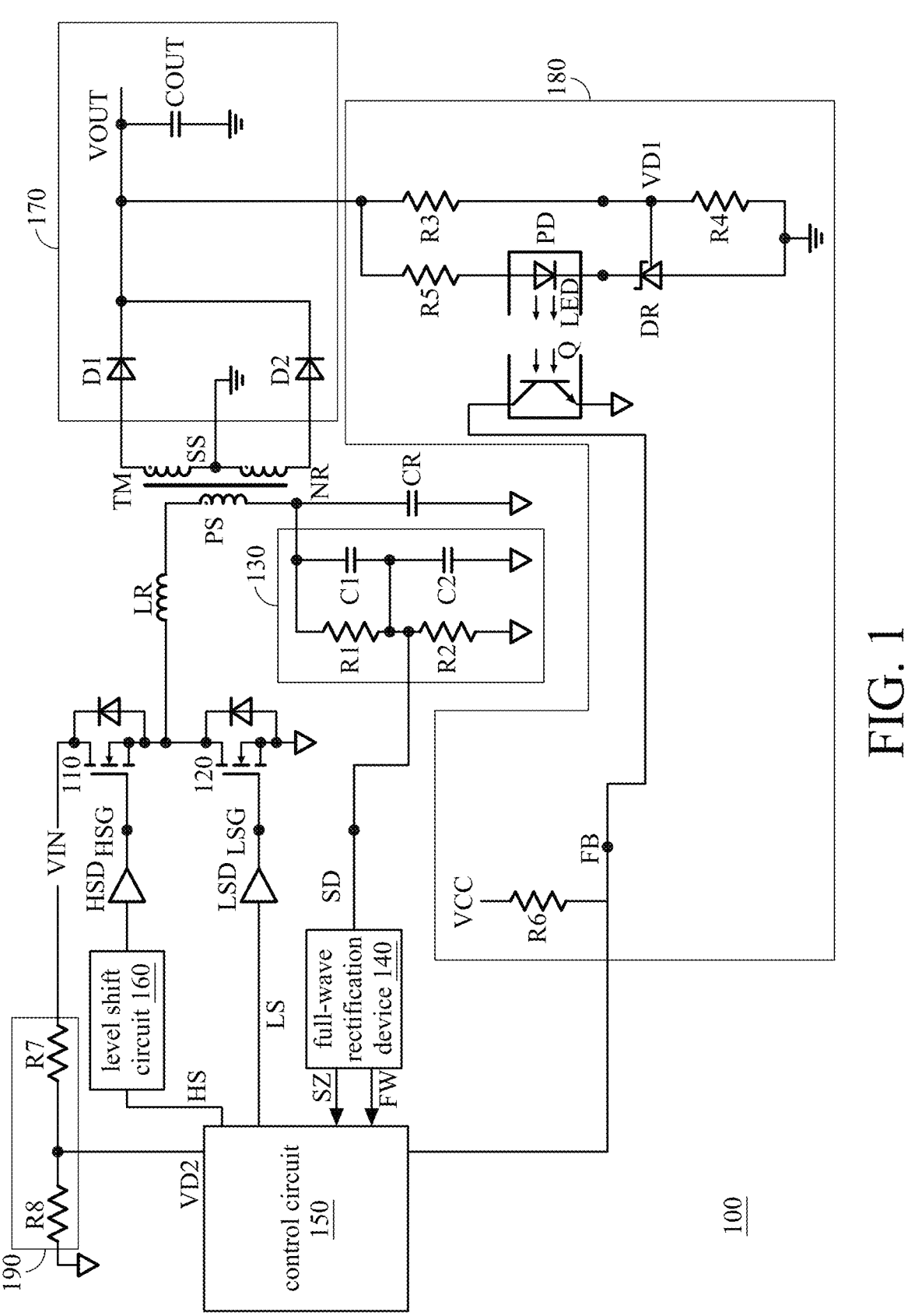
FIG. 1 is a block diagram showing a resonant power convertor in accordance with an embodiment of the present invention.

The following description is made for the purpose of illustrating the general principles of the disclosure and should not be taken in a limiting sense. The scope of the disclosure is determined by reference to the appended claims.

In the following detailed description, for purposes of explanation, numerous specific details and embodiments are set forth in order to provide a thorough understanding of the present disclosure. The use of like and/or corresponding numerals in the drawings of different embodiments does not suggest any correlation between different embodiments.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

In addition, in this specification, relative spatial expressions are used. For example, "lower", "bottom", "higher" or "top" are used to describe the position of one element relative to another. It should be appreciated that if a device is flipped upside down, an element that is "lower" will become an element that is "higher".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section in the specification could be termed a second element, component, region, layer, portion or section in the claims without departing from the teachings of the present disclosure.

It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

The terms "approximately", "about" and "substantially" typically mean a value is within a range of +/−20% of the stated value, more typically a range of +/−10%, +/−5%, +/−3%, +/−2%, +/−1% or +/−0.5% of the stated value. The stated value of the present disclosure is an approximate value. Even there is no specific description, the stated value still includes the meaning of "approximately", "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

In the drawings, similar elements and/or features may have the same reference number. Various components of the same type can be distinguished by adding letters or numbers after the component symbol to distinguish similar components and/or similar features.

FIG. 1 is a block diagram showing a resonant power convertor in accordance with an embodiment of the present invention. As shown in FIG. 1, the resonant power convertor 100 includes a transformer TM, a resonant inductor LR, a resonant capacitor CR, an high-side transistor 110, a low-side transistor 120, a first voltage divider 130, and a full-wave rectification device 140, a control circuit 150, a level shift circuit 160, a high-side driver HSD, a low-side driver LSD, a rectifying circuit 170, and a feedback circuit 180.

The transformer TM includes a primary coil PS and a secondary coil SS, where the primary coil PS is coupled to the resonant node NR. The resonant inductor LR is coupled between the switch node SW and the primary coil PS, and the resonant capacitor CR is coupled between the resonant node NR and the ground. According to an embodiment of the present invention, the resonant inductor LR can be replaced by the leakage inductance of the primary coil PS of the transformer TM. In other words, the primary coil PS may be coupled between the switch node SW and the resonant node NR.

The high-side gate driving signal HSG turns the high-side transistor 110 on or off to provide the input voltage VIN to the switch node SW. The low-side gate driving signal LSG turns the low-side transistor 120 on or off, thereby coupling the switch node SW to the ground. The first voltage divider 130 divides the voltage of the resonant node NR to generate a voltage-divided signal SD. In other words, the first voltage divider 130 is configured to divide the voltage across the resonant capacitor CR to generate the voltage-divided signal SD.

According to an embodiment of the present invention, the first voltage divider 130 may include a first capacitor C1 and a second capacitor C2. According to another embodiment of the present invention, the first voltage divider 130 may include a first resistor R1 and a second resistor R2. According to other embodiments of the present invention, the first voltage divider 130 may include a first capacitor C1, a second capacitor C2, a first resistor R1, and a second resistor R2. In the embodiment of FIG. 1, the voltage of the resonant node NR is divided by the first capacitor C1, the second capacitor C2, the first resistor R1, and the second resistor R2 as an explanation and is not intended to be limited thereto. According to other embodiments of the present invention, the voltage-divided signal SD can be amplified by an amplifier, so that the voltage-divided signal SD is close to the voltage of the resonant node NR, or even greater than the voltage of the resonant node NR.

The full-wave rectification device 140 full-wave rectifies the voltage-divided signal SD to generate the full-wave rectified signal FW and the crossover signal SZ. The control circuit 150 compares the full-wave rectified signal FW with the feedback voltage FB to generate a high-side driving signal HS and a low-side driving signal LS. The level shift circuit 160 is configured to convert the high-side driving signal HS into the voltage level of the input voltage VIN, and the high-side driving circuit HSD generates the high-side gate driving signal HSG to drive the high-side transistor 110. The low-side driving circuit LSD generates the low-side gate driving signal LSG based on the low-side driving signal LS to drive the low-side transistor 120.

The rectifying circuit 170 is coupled to the secondary coil SS and configured to convert the current flowing through the secondary coil SS into the output voltage VOUT. As shown in FIG. 1, the rectifying circuit 170 includes a first rectification unit D1, a second rectification unit D2, and an output capacitor COUT. The first rectification unit D1 and the second rectification unit D2 are configured to more efficiently charge the output capacitor COUT with the current flowing through the secondary coil SS, thereby generating the output voltage VOUT. According to other embodiments of the present invention, the first rectification unit D1 and the second rectification unit D2 can be replaced with electronic components with low on-resistance to further improve the conversion efficiency.

The feedback circuit 180 generates the feedback voltage FB based on the output voltage VOUT. As shown in FIG. 1, the feedback circuit 180 includes a third resistor R3, a fourth resistor R4, a voltage regulating unit DR, an light-coupling element PD, a fifth resistor R5, and a sixth resistor R6. The third resistor R3 and the fourth resistor R4 are configured to divide the output voltage VOUT to generate the first divided voltage VD1. The voltage regulating unit DR generates a current flowing through the diode LED of the light-coupling element PD causing the diode LED to emit light based on the first divided voltage VD1, and the transistor Q of the light-coupling element PD is turned on through optical coupling.

The fifth resistor R5 is configured to limit the current flowing through the diode LED. The feedback voltage FB is generated by the supply voltage VDD, the sixth resistor R6, and the turned-on transistor Q. According to an embodiment of the present invention, the voltage regulating unit DR may be TL431. According to some embodiments of the present invention, when the output voltage VOUT increases, the feedback voltage FB decreases accordingly. According to other embodiments of the present invention, when the output voltage VOUT decreases, the feedback voltage FB increases accordingly.

As shown in FIG. 1, the resonant power convertor 100 further includes a second voltage divider 190. The second voltage divider 190 includes a seventh resistor R7 and an eighth resistor R8. The second voltage divider 190 is configured to divide the input voltage VIN to generate a second divided voltage VD2. According to an embodiment of the present invention, the second divided voltage VD2 is equal to the input voltage VIN multiplied by the first ratio, where the first ratio is less than 1. The control method of the resonant power convertor 100 will be described in detail in the following paragraphs.

Figure 2:
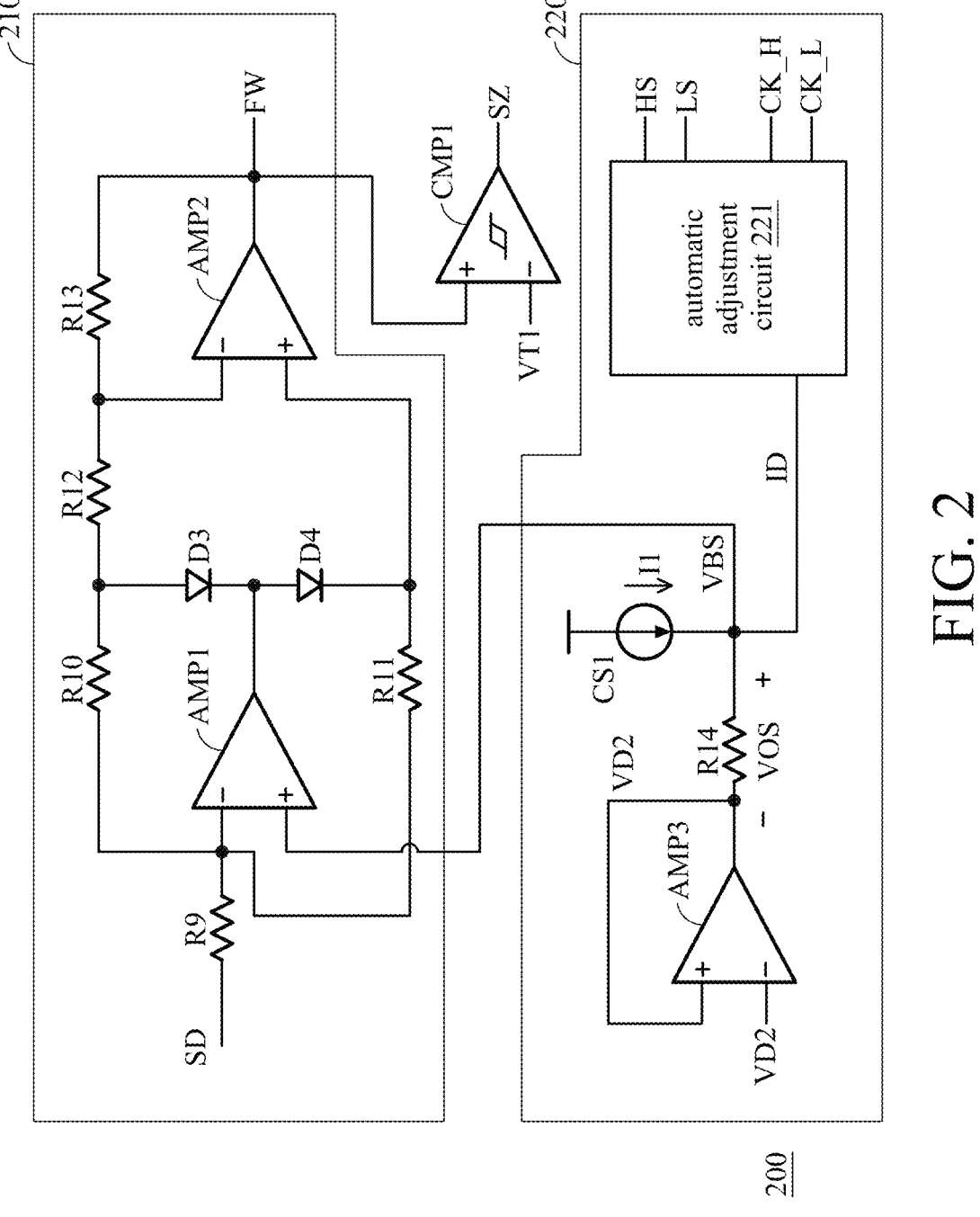
FIG. 2 is a block diagram showing a full-wave rectification device in accordance with an embodiment of the present invention.

FIG. 2 is a block diagram showing a full-wave rectification device in accordance with an embodiment of the present invention. According to an embodiment of the present invention, the full-wave rectification device 200 in FIG. 2 corresponds to the full-wave rectification device 140 in FIG. 1. As shown in FIG. 2, the full-wave rectification device 200 includes a full-wave rectifier 210, a first comparator CMP1, and a bias circuit 220. The full-wave rectifier 210 includes a ninth resistor R9, a tenth resistor R10, an eleventh resistor R11, a first amplifier AMP1, a twelfth resistor R12, a thirteenth resistor R13, a third diode D3, a fourth diode D4, and a second amplifier AMP2. The full-wave rectifier 210 uses the basic voltage VBS as the DC level to perform full-wave rectification on the voltage-divided signal SD generated by the first voltage divider 130 to generate the full-wave rectified signal FW.

The first comparator CMP1 compares the full-wave rectified signal FW with the first threshold voltage VT1 to generate a crossover signal SZ. According to an embodiment of the present invention, the first threshold voltage VT1 is slightly greater than the basic voltage VBS. According to an embodiment of the present invention, when the full-wave rectified signal FW is less than the first threshold voltage VT1, the first comparator CMP1 sets the crossover signal SZ to the disabled state. According to another embodiment of the present invention, when the full-wave rectified signal FW exceeds the first threshold voltage VT1, the first comparator CMP1 sets the crossover signal SZ to the enabled state.

The bias circuit 220 includes a third amplifier AMP3, a first current source CS1, a fourteenth resistor R14, and an automatic adjustment circuit 221. As shown in FIG. 2, the positive input terminal of the third amplifier AMP3 receives the second divided voltage VD2 and the third amplifier AMP3 is connected in the form of a unity gain buffer, so that the voltage of the output terminal of the third amplifier AMP3 is equal to the second divided voltage VD2. The first current source CS1 generates a first current I1 flowing to the basic voltage VBS. The fourteenth resistor R14 is coupled between the basic voltage VBS and the output terminal of the third amplifier AMP3.

The automatic adjustment circuit 221 sinks an adjustment current ID from the basic voltage VBS based on the high-side driving signal HS, the low-side driving signal LS, the high-side dead time signal CK_H, and the low-side dead time signal CK_L. The automatic adjustment circuit 221, the high-side dead time signal CK_H, and the low-side dead time signal CK_L will be described in the following paragraphs. According to an embodiment of the present invention, the basic voltage VBS is equal to the sum of the second divided voltage VD2 and the offset voltage VOS.

According to an embodiment of the present invention, since the first current I1 exceeds the adjustment current ID, the offset voltage VOS is a positive value, and the basic voltage VBS exceeds the second divided voltage VD2. According to another embodiment of the present invention, since the first current I1 is less than the adjustment current ID, the offset voltage VOS is a negative value, and the basic voltage VBS is less than the second divided voltage VD2. According to another embodiment of the present invention, in response to the first current I1 being equal to the adjustment current ID, the basic voltage VBS is equal to the second divided voltage VD2. According to another embodiment of the present invention, since the first current I1 is equal to the adjustment current ID, the offset voltage VOS is zero, and the basic voltage VBS is equal to the second divided voltage VD2.

Figure 3:
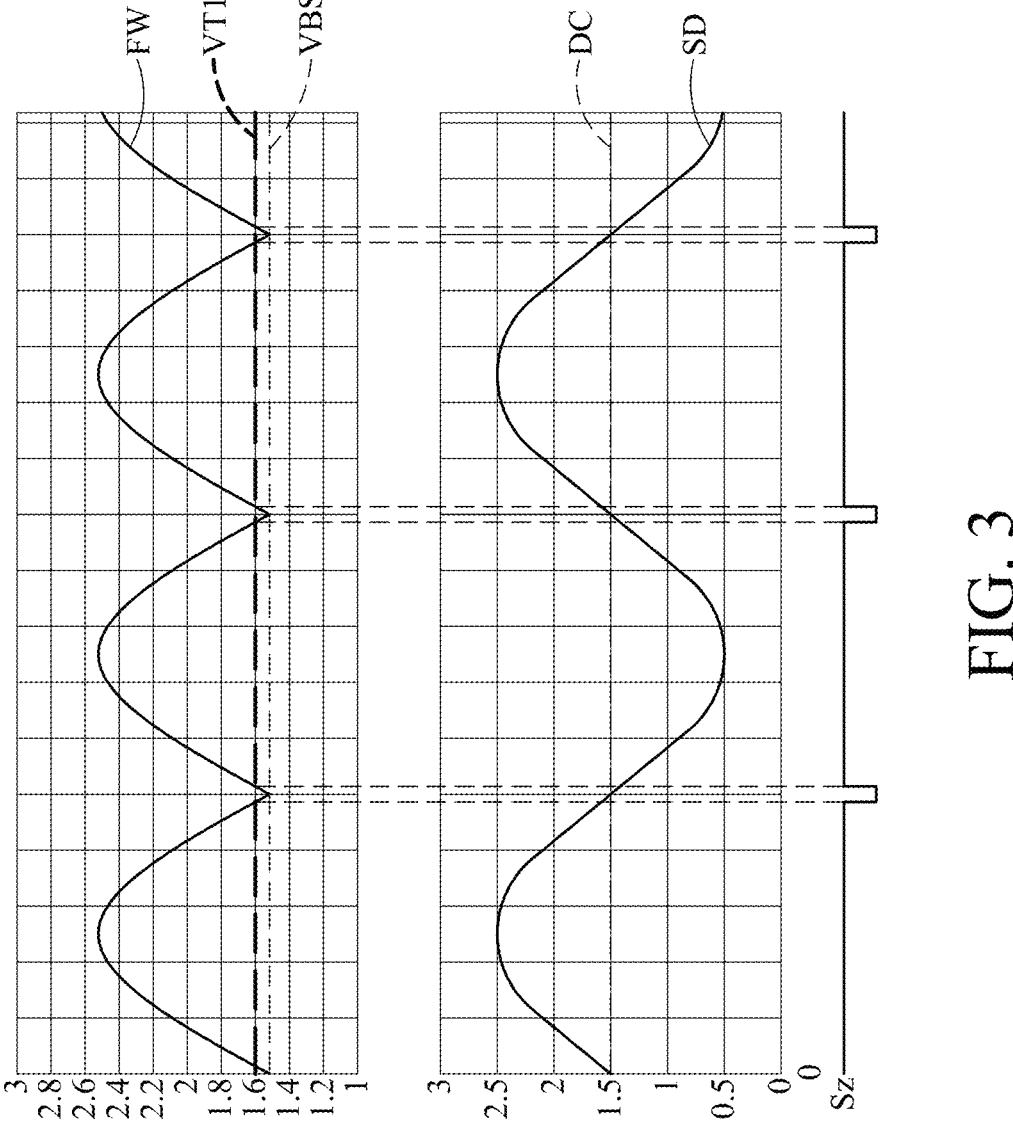
FIG. 3 is a waveform diagram showing the full-wave rectified signal and the voltage-divided signal in accordance with an embodiment of the present invention.

FIG. 3 is a waveform diagram showing the full-wave rectified signal and the voltage-divided signal in accordance with an embodiment of the present invention. As shown in FIG. 3, the voltage-divided signal SD has a direct current level DC. The full-wave rectifier 210 uses the basic voltage VBS as the DC level to perform full-wave rectification on the voltage-divided signal SD to generate a full-wave rectified signal FW. Then, the first comparator CMP1 compares the full-wave rectified signal FW to the first threshold voltage VT1 to generate the crossover signal SZ. As shown in FIG. 3, when the full-wave rectified signal FW is less than the first threshold voltage VT1, the first comparator CMP1 disables the crossover signal SZ.

Figure 4:
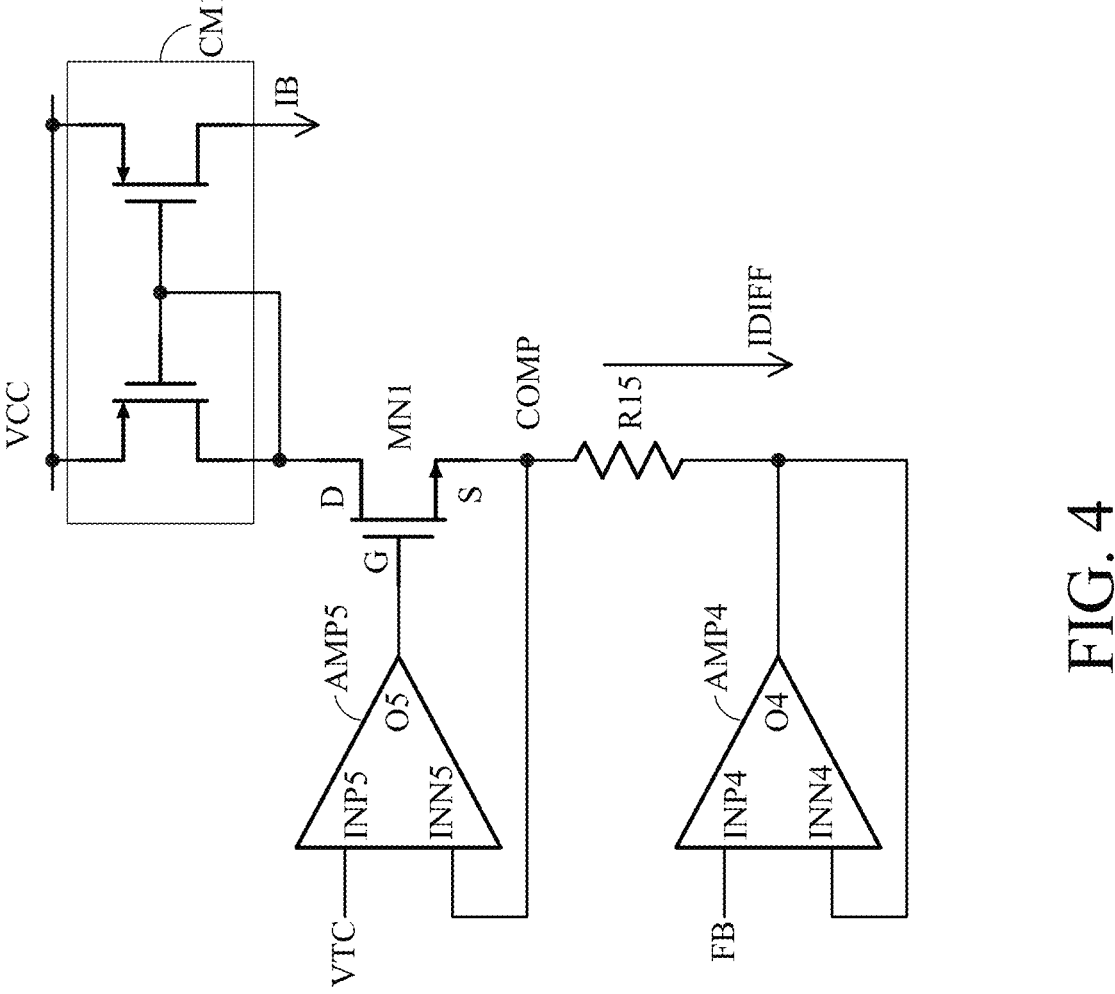
FIG. 4 is a block diagram showing a compensation circuit in accordance with an embodiment of the present invention.

FIG. 4 is a block diagram showing a compensation circuit in accordance with an embodiment of the present invention. According to an embodiment of the present invention, the control circuit 150 in FIG. 1 includes a compensation circuit 400. As shown in FIG. 4, the compensation circuit 400 includes a fourth amplifier AMP4, a fifth amplifier AMP5, a fifteenth resistor R15, a first N-type transistor MN1, and a first current mirror CM1. The compensation circuit 400 is configured to generate the compensation voltage COMP based on the feedback voltage FB and to limit the compensation voltage COMP to not be less than the feedback threshold voltage VTC. In other words, the compensation voltage COMP generated by the compensation circuit 400 is equal to the feedback voltage FB, and the minimum value of the compensation voltage COMP is limited to the feedback threshold voltage VTC.

The fourth amplifier AMP4 includes a fourth positive input terminal INP4, a fourth negative input terminal INN4, and a fourth output terminal O4, wherein the fourth positive input terminal INP4 receives the feedback voltage FB, and the fourth negative input terminal INN4 is coupled to The fourth output terminal O4. The fifth amplifier AMP5 includes a fifth positive input terminal INP5, a fifth negative input terminal INN5, and a fifth output terminal O5, wherein the fifth positive input terminal INP5 receives the feedback threshold voltage VTC. According to an embodiment of the present invention, the fourth amplifier AMP4 is coupled as a unity gain amplifier, so the voltage of the fourth output terminal O4 is equal to the feedback voltage FB.

The fifteenth resistor R15 is coupled between the fifth negative input terminal INN5 and the fourth output terminal O4, and generates a differential current IDIFF. The first N-type transistor MN1 includes a gate terminal G, a drain terminal D, and a source terminal S. The gate terminal G is coupled to the fifth output terminal O5, and the source terminal S is coupled to the fifth negative input terminal INN5 and generates a compensation voltage COMP. The first current mirror CM1 is coupled to the drain terminal D, and maps the difference current IDIFF to the mapping current IB. According to some embodiments of the present invention, the mapping current IB is N times the difference current IDIFF, where N is the mapping ratio of the first current mirror CM1.

According to an embodiment of the present invention, when the feedback voltage FB is less than the feedback threshold voltage VTC, the difference between the feedback threshold voltage VTC and the feedback voltage FB and the resistance value of the fifteenth resistor R15 generate a difference current IDIFF. The difference current IDIFF is mapped to the mapping current IB through the first current mirror CM1, and the compensation voltage COMP is equal to the feedback threshold voltage VTC. According to another embodiment of the present invention, when the feedback voltage FB is greater than or equal to the feedback threshold voltage VTC, the fifth amplifier AMP5 does not turn on the first N-type transistor MN1 so that the first current mirror CM1 does not generate the mapping current IB, and the compensation voltage COMP is equal to the feedback voltage FB.

In other words, when the feedback voltage FB is less than the feedback threshold voltage VTC, the compensation voltage COMP is equal to the feedback threshold voltage VTC, and the mapping current IB is correspondingly generated. When the feedback voltage FB is not less than the feedback threshold voltage VTC, the compensation voltage COMP is equal to the feedback voltage FB, and the mapping current IB is not generated. The function of mapping current IB will be explained in the following paragraphs.

Figure 5:
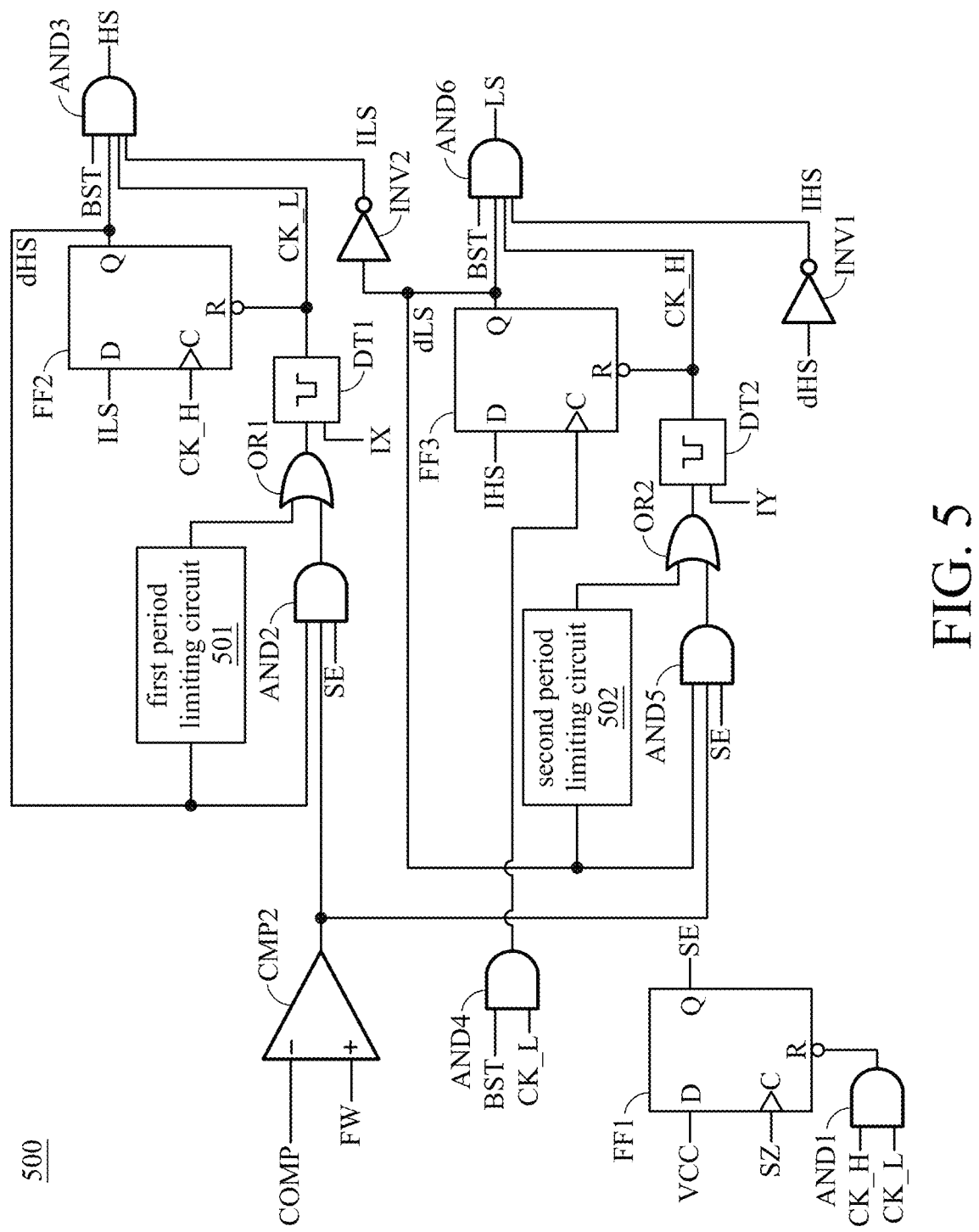
FIG. 5 is a block diagram showing a control circuit in accordance with an embodiment of the present invention.

FIG. 5 is a block diagram showing a control circuit in accordance with an embodiment of the present invention. As shown in FIG. 5, the control circuit 500 includes a first flip-flop FF1 and a first AND gate AND1. The first flip-flop FF1 outputs the supply voltage VCC as the phase signal SE (that is, the phase signal SE is set to the enabled state) based on the positive signal edge of the crossover signal SZ (that is, the crossover signal SZ changes from the disabled state to the enabled state). According to some embodiments of the present invention, the crossover signal SZ at a low logic level is in a disabled state, and the crossover signal SZ at a high logic level is in an enabled state. In other words, when the full-wave rectified signal FW increases to exceed the first threshold voltage VT1, the phase signal SE is enabled.

The first flip-flop FF1 further sets the phase signal SE to a disabled state based on the high-side dead time signal CK_H or the low-side dead time signal CK_L being in the disabled state (i.e., a low logic level). In other words, during the high-side dead time and the low-side dead time, the phase signal SE is in the disabled state. As shown in FIG. 5, the control circuit 500 further includes a second comparator CMP2, a second AND gate AND2, a first OR gate OR1, a first dead time generator DT1, a second flip-flop FF2, and a third AND gate. AND3.

When the full-wave rectified signal FW exceeds the compensation voltage COMP generated by the compensation circuit 400, the delayed high-side driving signal dHS is in the enabled state, and the phase signal SE is in the enabled state, a negative pulse is generated on the low-side dead time signal CK_L by triggering the first dead time generator DT1 through the second AND gate AND2 and the first OR gate OR1, and the high-side driving signal HS is set to the disabled state through the third AND gate AND3, thereby turning off the high-side transistor 110 in FIG. 1. In addition, the negative pulse of the low-side dead time signal CK_L resets the second flip-flop FF2, causing the delayed high-side driving signal dHS to be reset to the disabled state. According to an embodiment of the present invention, the width of the negative pulse of the low-side dead time signal CK_L is configured to determine the low-side dead time of the low-side transistor 120. According to an embodiment of the present invention, the first adjustment current IX is configured to adjust the length of the low-side dead time.

As shown in FIG. 5, the control circuit 500 further includes a first inverter INV1, a fourth AND gate AND4, a third flip-flop FF3, a fifth AND gate AND5, a second OR gate OR2, a second dead time generator DT2, and sixth AND gate AND6. The first inverter INV1 inverts the delayed high-side driving signal dHS in the disabled state and sets the initial high-side driving signal IHS to the enabled state. When the low-side dead time signal CK_L changes from the disabled state (negative pulse) to the enabled state and the burst signal BST is in the enabled state, the third flip-flop FF3 outputs the initial high-side driving signal IHS in the enabled state as the delayed low-side driving signal dLS (that is, in the enabled state).

Then, when the delayed low-side driving signal dLS is in the enabled state, the full-wave rectified signal FW exceeds the compensation voltage COMP, and the phase signal SE is in the enabled state, the second dead time generator DT2 is triggered to generate a negative pulse on the high-side dead time signal CK_H through the fifth AND gate AND5 and the second OR gate OR2, and the low-side driving signal HS is set to the disabled state through the sixth AND gate AND6, thereby turning off the low-side transistor 120 in FIG. 1. In addition, the negative pulse of the high-side dead time signal CK_H resets the third flip-flop FF3, causing the delayed low-side driving signal dLS to be in the disabled state. According to an embodiment of the present invention, the width of the negative pulse of the high-side dead time signal CK_H is configured to determine the high-side dead time of the high-side transistor 120. According to an embodiment of the present invention, the second adjustment current IY is configured to adjust the length of the high-side dead time.

As shown in FIG. 5, the control circuit 500 further includes a first period limiting circuit 501, a second period limiting circuit 502, and a second inverter INV2. When the enable period of the high-side driving signal HS exceeds the maximum enable period, the first period limit circuit 501 sends an enable signal to trigger the first dead time generator DT1 to generate a negative pulse to reset (or disable) the delayed high-side driving signal dHS, thereby disabling the high-side driving signal HS. According to an embodiment of the present invention, the high-side transistor 110 is turned on during the enable period of the high-side driving signal HS, and the low-side transistor 120 is turned on during the enable period of the low-side driving signal LS.

When the enable period of the low-side driving signal LS exceeds the maximum enable period, the second period limiting circuit 502 sends an enable signal to trigger the second dead time generator DT2 to generate a negative pulse to reset or disable the delayed high-side driving signal dLS, thereby disabling the low-side driving signal LS. The second inverter INV2 is configured to invert the delayed low-side driving signal dLS to generate the initial low-side driving signal ILS.

Figure 6:
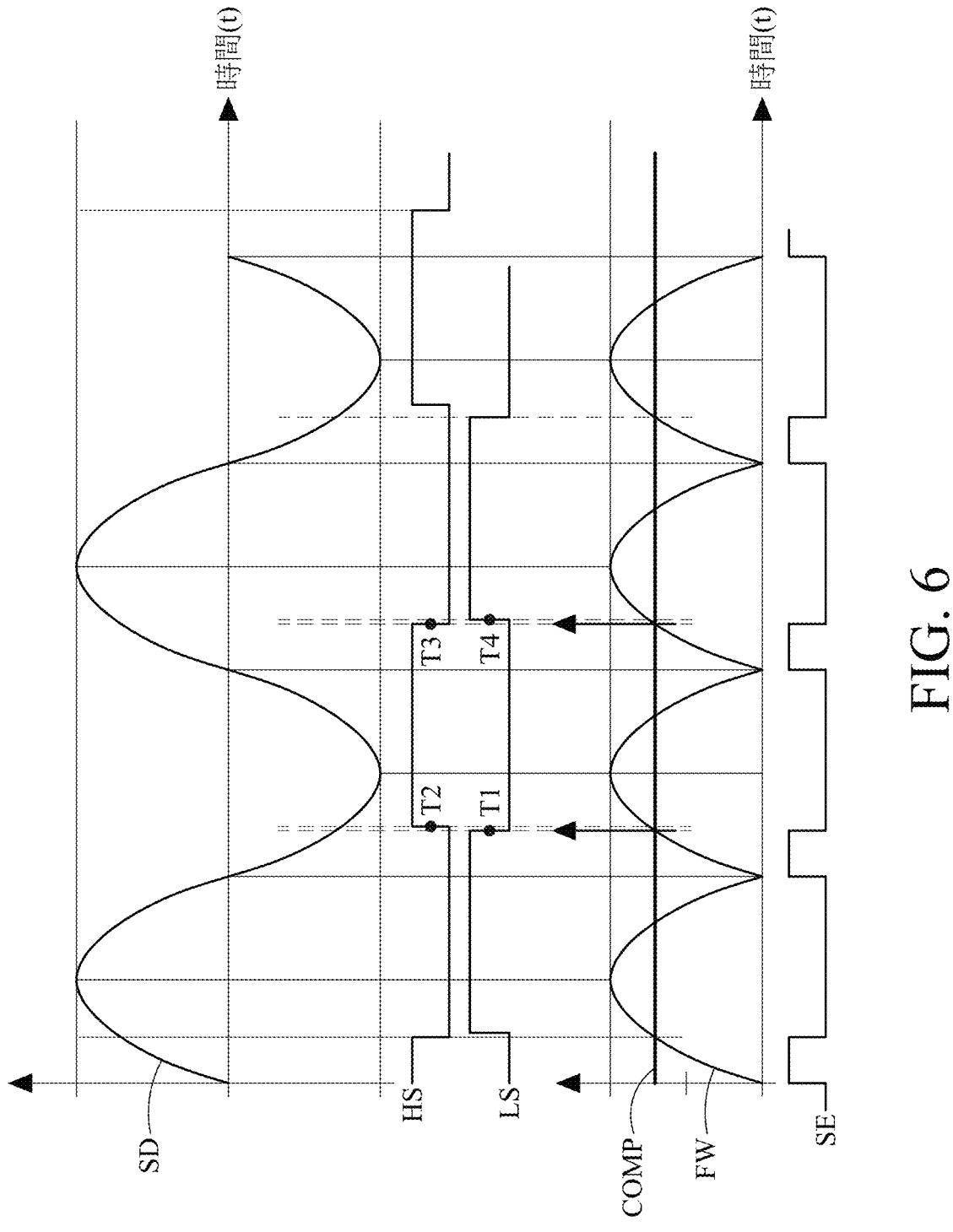
FIG. 6 is a waveform diagram showing a control circuit in accordance with an embodiment of the present invention.

FIG. 6 is a waveform diagram showing a control circuit in accordance with an embodiment of the present invention. A detailed explanation will be described below in conjunction with the control circuit 500 in FIG. 5 and the waveform diagram 600 in FIG. 6.

At the first time point T1 in FIG. 6, the low-side driving signal LS is in the enabled state and the rectification signal FW keeps increasing to exceed the compensation voltage COMP. As shown in FIG. 5, since the full-wave rectified signal FW exceeds the compensation voltage COMP, the output of the second comparator CMP2 triggers the second dead time generator DT2 to generate a negative pulse on the high-side dead time signal CK_H through the fifth AND gate AND5 and the second OR gate OR2, and the negative pulse of the high-side dead time signal CK_H resets the first flip-flop FF1 and disables the phase signal SE. In addition, the negative pulse of the high-side dead time signal CK_H disables the low-side driving signal LS at the same time.

According to an embodiment of the present invention, when the high-side dead time signal CK_H is in a disabled state, that is, between the first time point T1 and the second time point T2, the third flip-flop FF3 is reset to disable the delayed low-side driving signal dLS. Furthermore, the disabled delayed low-side driving signal dLS passes through the fifth AND gate AND5 and the second OR gate OR2 to stop the second dead time generator DT2 keeping disabling the high-side dead time signal CK_H, thereby ending the high-side dead time and going to the second time point T2.

At the second time point T2 in FIG. 6, the high-side dead time signal CK_H goes back to the enabled state from the negative pulse. That is, the high-side dead time signal CK_H generates a positive signal edge at the second time T2, so that the second flip-flop FF2 outputs the initial low-side driving signal ILS in the enabled state as the delayed high-side driving signal dHS, and sets the high-side driving signal HS to the enabled state through the third AND gate AND3.

At the third time point T3 in FIG. 6, the high-side driving signal HS continues to be in the enabled state, and the full-wave rectified signal FW continues to increase and just exceeds the compensation voltage COMP. As shown in FIG. 5, since the full-wave rectified signal FW increases to exceed the compensation voltage COMP, the output of the second comparator CMP2 triggers the first dead time generator DT1 through the second AND gate AND2 and the first OR gate OR1. The low-side dead time signal CK_L generates a negative pulse, and the negative pulse of the low-side dead time signal CK_L resets the first flip-flop FF1 and disables the phase signal SE. In addition, the negative pulse of the low-side dead time signal CK_L passes through the third AND gate AND3 to disable the high-side driving signal HS at the same time.

According to an embodiment of the present invention, when the low-side dead time signal CK_L is in the disabled state, the second flip-flop FF2 is reset to disable the delayed high-side driving signal dHS, and the disabled delayed high-side drive signal dHS passes through the second AND gate AND2 and the first OR gate OR1 to stop the first dead time generator DT1 keeping disabling the low-side dead time signal CK_L, so that the low-side dead time signal CK_L returns to the enabled state.

At the fourth time point T4 in FIG. 6, the low-side dead time signal CK_L returns to the enabled state from the negative pulse. That is, the low-side dead time signal CK_L generates a positive signal edge at the fourth time point T4, plus the burst signal BST is in the enabled state, so that the third flip-flop FF3 outputs the initial high-side driving signal IHS in the enabled state as the delayed low-side driving signal dLS, and sets the low-side driving signal LS to the enabled state through the sixth AND gate AND6.

Figure 7:
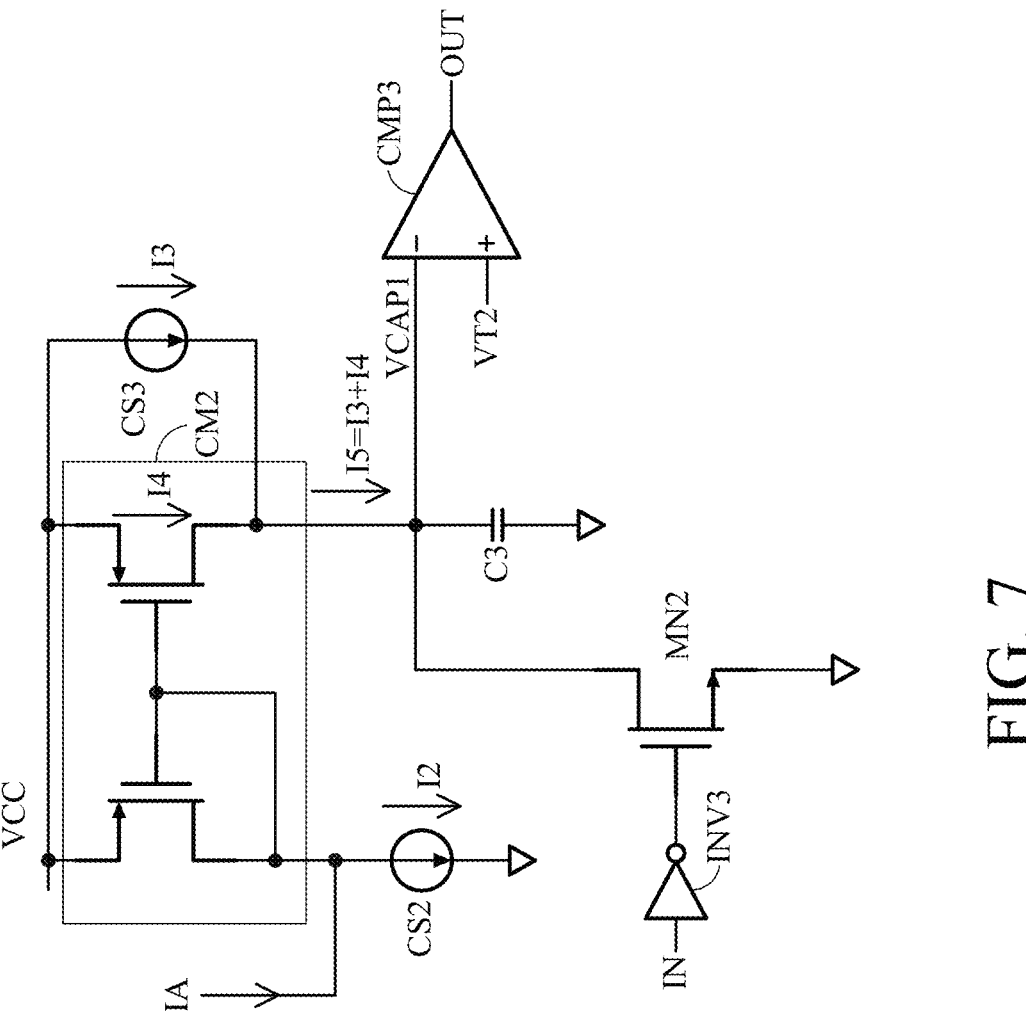
FIG. 7 is a circuit diagram showing a dead time generator in accordance with an embodiment of the present invention.

FIG. 7 is a circuit diagram showing a dead time generator in accordance with an embodiment of the present invention. According to an embodiment of the present invention, the delay time generator 700 in FIG. 7 corresponds to the first dead time generator DT1 and the second dead time generator DT2 in FIG. 5.

As shown in FIG. 7, the delay time generator 700 includes a third inverter INV3, a second N-type transistor MN2, a third capacitor C3, a second current source CS2, a second current mirror CM2, a third current source CS3, and a third comparator CMP3.

When the input signal IN received by the third inverter INV3 is in a disabled state, the second N-type transistor MN2 is turned on to couple the first capacitor voltage VCAP1 generated by the third capacitor C3 to the ground. When the third inverter INV3 then receives the input signal IN in the enabled state, the second N-type transistor MN2 is turned off, and the second current mirror CM2 maps the second current I2 generated by the second current source CS2 to the fourth current I4. In addition, since the third current I3 generated by the third current source CS3 in parallel with the second current mirror CM2 is added, the third capacitor C3 is charged by the fifth current I5 to generate the first capacitor voltage VCAP1. According to an embodiment of the present invention, the fifth current I5 is the sum of the third current I3 and the fourth current I4.

When the first capacitor voltage VCAP1 exceeds the second threshold voltage VT2, the third comparator CMP3 generates an output signal OUT in a disabled state. When the input signal IN returns to the disabled state again, the second N-type transistor MN2 is turned on to discharge the first capacitor voltage VCAP1 to the ground, so that the output signal OUT generated by the third comparator CMP3 returns to the enabled state again. According to an embodiment of the present invention, the length of the charging time is determined based on the fifth current I5 and the capacitance value of the third capacitor C3.

According to an embodiment of the present invention, when the input current IA is additionally provided to the second current source CS2, the magnitude of the fourth current I4 is reduced, thereby reducing the fifth current I5 for charging the third capacitor C3. Therefore, the period of the output signal OUT remaining in the disabled state is extended. In other words, by increasing the magnitude of the input current IA, the duration of the negative pulse of the output signal OUT can be adjusted. According to some embodiments of the present invention, the input current IA in FIG. 7 corresponds to the first adjustment current IX and the second adjustment current IY in FIG. 5.

Figure 8:
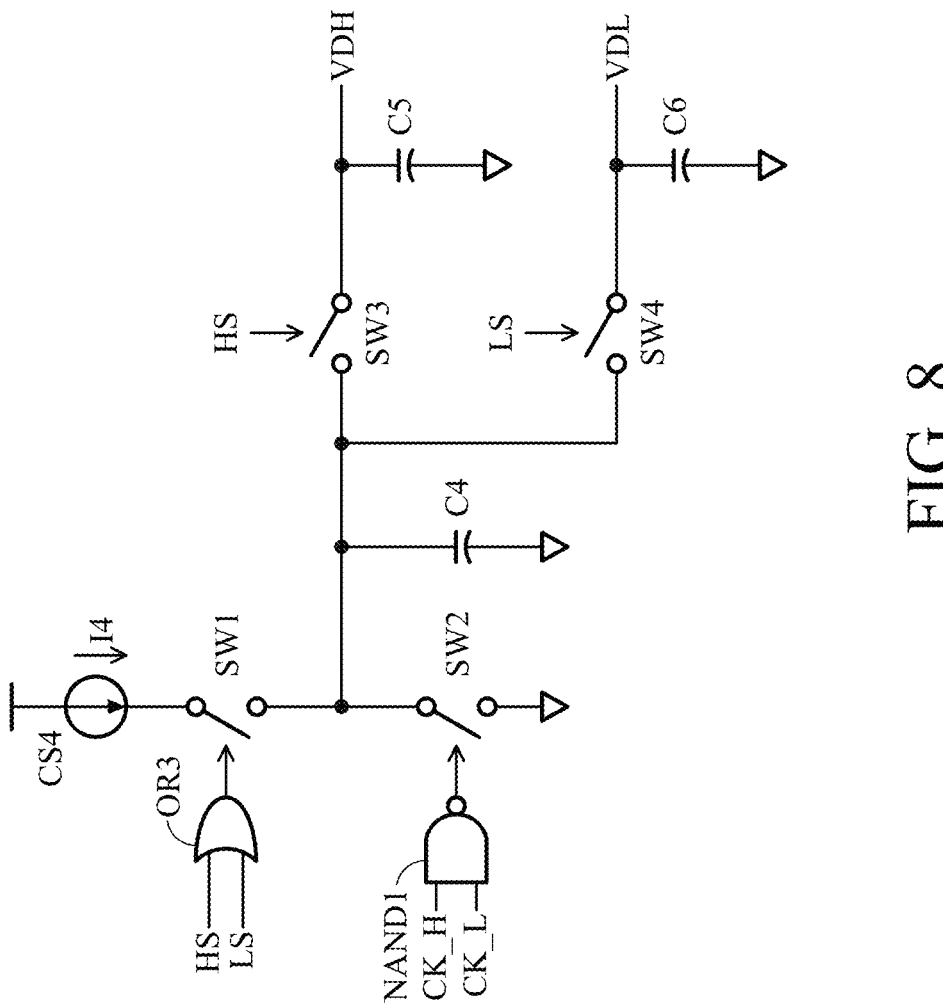
FIG. 8 is a schematic diagram showing a time-to-voltage conversion circuit in accordance with an embodiment of the present invention.

FIG. 8 is a schematic diagram showing a time-to-voltage conversion circuit in accordance with an embodiment of the present invention. According to an embodiment of the present invention, the automatic adjustment circuit 221 in FIG. 2 includes a time-to-voltage conversion circuit 800. As shown in FIG. 8, the time-to-voltage conversion circuit 800 includes a fourth current source CS4, a third OR gate OR3, a first switch SW1, a first NAND gate NAND1, a second switch SW2, a fourth capacitor C4, a third switch SW3, a fifth capacitor C5, a fourth switch SW4, and a sixth capacitor C6.

The fourth current source CS4 generates the fourth current I4, and the third OR gate OR3 performs a logical OR operation on the high-side driving signal HS and the low-side driving signal LS to turn on the first switch SW1, so that the sixth current I6 charges the fourth capacitors C4. The first NAND gate NAND1 performs a logical NAND operation on the high-side dead time signal CK_H and the low-side dead time signal CK_L to turn on the second switch SW2, causing the fourth capacitor C4 to discharge to the ground.

The high-side driving signal HS controls the third switch SW3, so that the sixth current I6 charges the fifth capacitor C5 to generate the high-side enable-period voltage VDH. The low-side driving signal LS controls the fourth switch SW4 so that the sixth current I6 can charge the sixth capacitor C6 to generate the low-side enable-period voltage VDL.

In other words, when the high-side driving signal HS is in the enabled state, the sixth current I6 charges the fourth capacitor C4 and the fifth capacitor C5. When the low-side driving signal LS is in the enabled state, the sixth current I6 charges the fourth capacitor C4 and the sixth capacitor C6. During the high-side dead time and the low-side dead time, the fourth capacitor C4 is discharged, and the charge stored in the fourth capacitor C4 is cleared. Therefore, the high-side enable-period voltage VDH represents the enable period of the high-side driving signal HS, and the low-side enable-period voltage VDL represents the enable period of the low-side driving signal LS.

Figure 9:
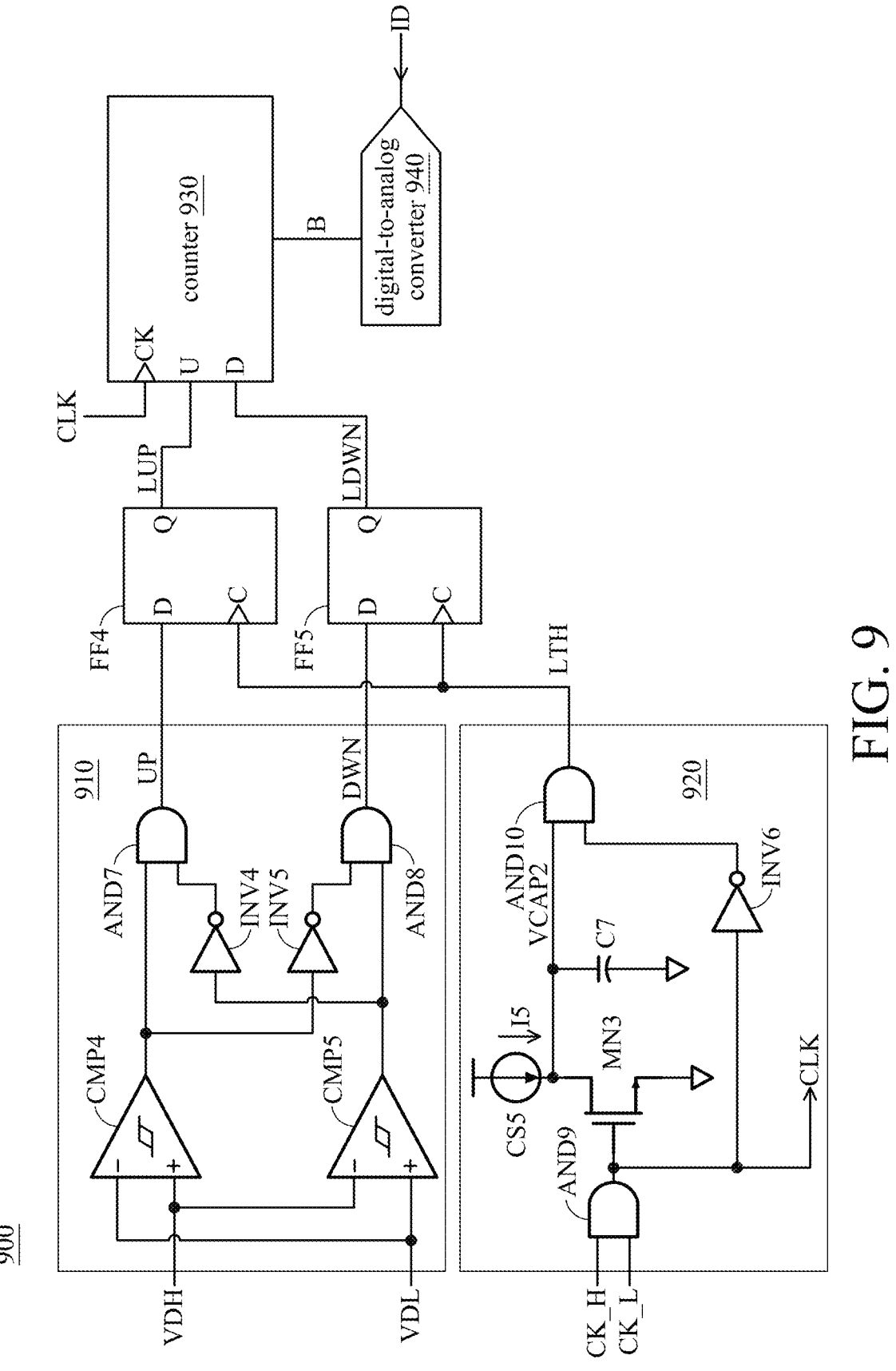
FIG. 9 is a schematic diagram showing an automatic adjustment circuit in accordance with an embodiment of the present invention.

FIG. 9 is a schematic diagram showing an automatic adjustment circuit in accordance with an embodiment of the present invention. According to an embodiment of the present invention, the automatic adjustment circuit 900 corresponds to the automatic adjustment circuit 221 in FIG. 2.

As shown in FIG. 9, the automatic adjustment circuit 900 includes a comparison circuit 910, a signal generation circuit 920, a fourth flip-flop FF4, a fifth flip-flop FF5, a counter 930, and a digital-to-analog converter 940. The comparison circuit 910 is configured to compare the high-side enable-period voltage VDH and the low-side enable-period voltage VDL to generate an up-count signal UP and a down-count signal DWN.

The signal generation circuit 920 generates the clock signal CLK and the latch signal LTH based on the high-side dead time signal CK_H and the low-side dead time signal CK_L. The fourth flip-flop FF4 latches the up-count signal UP based on the latch signal LTH to be the latched up-count signal LUP. The fifth flip-flop FF5 latches the down-count signal DWN based on the latch signal LTH to be the latched down-count signal LDWN. The counter 930 counts the digital code B based on the clock signal CLK. When the latched up-count signal LUP is in the enabled state and the latched down-count signal LDWN is in the disabled state, the counter 930 up-counts the digital code B. When the latched up-count signal LUP is in a disabled state and the latched down-count signal LDWN is in an enabled state, the counter 930 down-counts the digital code B.

As shown in FIG. 9, the comparison circuit 910 includes a fourth comparator CMP4, a fifth comparator CMP5, a fourth inverter INV4, a fifth inverter INV5, a seventh AND gate AND7, and an eighth AND gate AND8. When the high-side enable-period voltage VDH exceeds the low-side enable-period voltage VDL, the output of the fourth comparator CMP4 is in the enabled state and the output of the fifth comparator CMP5 is in the disabled state. When the high-side enable-period voltage VDH does not exceed the low-side enable-period voltage VDL, the output of the fourth comparator CMP4 is in the disabled state and the output of the fifth comparator CMP5 is in the enabled state. Then, the up-count signal UP and the down-count signal DWN are generated through the fourth inverter INV4, the fifth inverter INV5, the seventh AND gate AND7, and the eighth AND gate AND8.

In other words, when the high-side enable-period voltage VDH exceeds the low-side enable-period voltage VDL, the up-count signal UP is in the enabled state and the down-count signal DWN is in the disabled state. When the high-side enable-period voltage VDH does not exceed the low-side enable-period voltage VDL, the up-count signal UP is in the disabled state and the down-count signal DWN is in the enabled state. That is, when the enable period of the high-side driving signal HS exceeds the enable period of the low-side driving signal LS, the counter 930 up-counts the digital code B to cause the digital-to-analog converter 940 to increase the adjustment current ID. When the enable period of the high-side driving signal HS does not exceed the enable period of the low-side driving signal LS, the counter 930 down-counts the digital code B to cause the digital-to-analog converter 940 to reduce the adjustment current ID.

The signal generating circuit 920 includes a ninth AND gate AND9, a fifth current source CS5, a third N-type transistor MN3, a seventh capacitor C7, a sixth inverter INV6, and a tenth N-type gate AND10. The ninth AND gate AND9 performs a logical AND operation on the high-side dead time signal CK_H and the low-side dead time signal CK_L to generate the clock signal CLK. When either the high-side dead time signal CK_H or the low-side dead time signal CK_L is in a negative pulse, the clock signal CLK is in the disabled state, the seventh current I7 of the fifth current source CS5 charges the seventh capacitor C7 to generate the second capacitor voltage VCAP2, and the sixth inverter INV6 inverts the clock signal CLK, causing the latch signal LTH output by the tenth AND gate AND10 to generate a positive signal edge, thereby triggering the fourth flip-flop FF4 and the fifth flip-flop FF5 to latch the up-count signal UP and the down-count signal DWN respectively.

According to an embodiment of the present invention, when the enable period of the high-side driving signal HS exceeds the enable period of the low-side driving signal LS, the adjustment current ID is increased to increase the offset voltage VOS and the basic voltage VBS, thereby shortening the enable period of the high-side driving signal HS and extending the enable period of the low-side driving signal LS. According to another embodiment of the present invention, when the enable period of the high-side driving signal HS does not exceed the enable period of the low-side driving signal LS, the adjustment current ID is reduced to reduce the offset voltage VOS and the basic voltage VBS, thereby extending the high-side driving signal LS and shortening the enable period of the low-side driving signal LS. In other words, by adjusting the basic voltage VBS, the enable period of the high-side driving signal HS is close to the enable period of the low-side driving signal LS.

Figure 10:
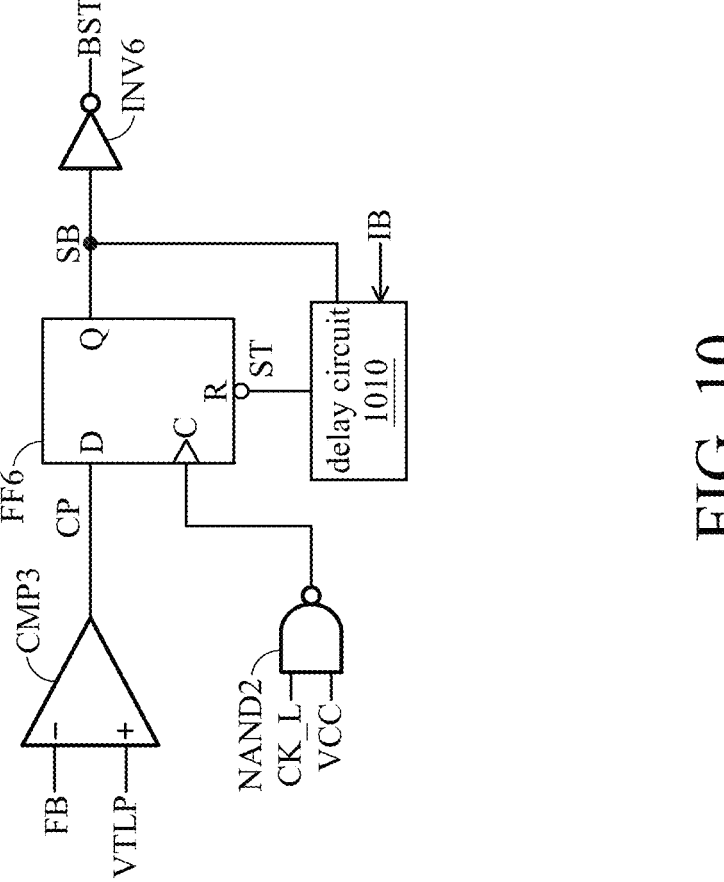
FIG. 10 is a block diagram showing an output voltage detection circuit in accordance with embodiment of the present invention.

FIG. 10 is a block diagram showing an output voltage detection circuit in accordance with embodiment of the present invention. According to an embodiment of the present invention, the control circuit 150 in FIG. 1 further includes an output voltage detection circuit 1000. As shown in FIG. 10, the output voltage detection circuit 1000 includes a sixth comparator CMP6, a second inverter NAND2, a sixth flip-flop FF6, a sixth inverter INV6, and a delay circuit 1010.

The sixth comparator CMP6 compares the feedback voltage FB to the low-power threshold voltage VTLP to generate a comparison signal CP. According to an embodiment of the present invention, when the output voltage VOUT in FIG. 1 increases, the feedback voltage FB decreases, and the increase in the output voltage VOUT represents a decrease in the output power. In other words, when the comparison signal CP in FIG. 10 is at the high logic level, it means that the output power is too low.

The second inverter NAND2 performs a logical inverse operation on the low-side dead time signal CK_L and the supply voltage VCC to trigger the sixth flip-flop FF6 to output the comparison signal CP as an inverted burst signal SB, and the inverted burst signal SB passes through the sixth inverter INV6 to generate the burst signal BST. According to an embodiment of the present invention, when the low-side dead time signal CK_L changes from the disabled state to the enabled state to enable the high-side driving signal HS, since the comparison signal CP is at the high logic level (representing that the output voltage VOUT is too high), the burst signal BST in the low logic level is provided to the third AND gate AND3 and the sixth AND gate AND6 in FIG. 2 to simultaneously disable the high-side driving signal HS and the low-side driving signal LS. In the embodiment of the present invention, it is illustrated that the burst signal BST in the low logic level is in the enable state to trigger the burst mode for explanation, but it is not intended to be limited thereto.

In addition, after the delay circuit 1010 receives the inverted burst signal SB in the high logic level, a delay time is delayed to generate the reset signal ST, and the mapped current IB in FIG. 4 is configured to adjust the delay time of the delay circuit 1010. According to an embodiment of the present invention, the delay circuit 1010 can be implemented by the delay time generator 700 in FIG. 7, wherein the inverted burst signal SB corresponds to the input signal IN in FIG. 7, and the reset signal ST corresponds to the output signal OUT in FIG. 7, which will not be repeated herein. According to an embodiment of the present invention, the supply voltage VCC provided to the second NAND gate NAND2 can be replaced by the high-side dead time signal CK_H.

Figure 11:
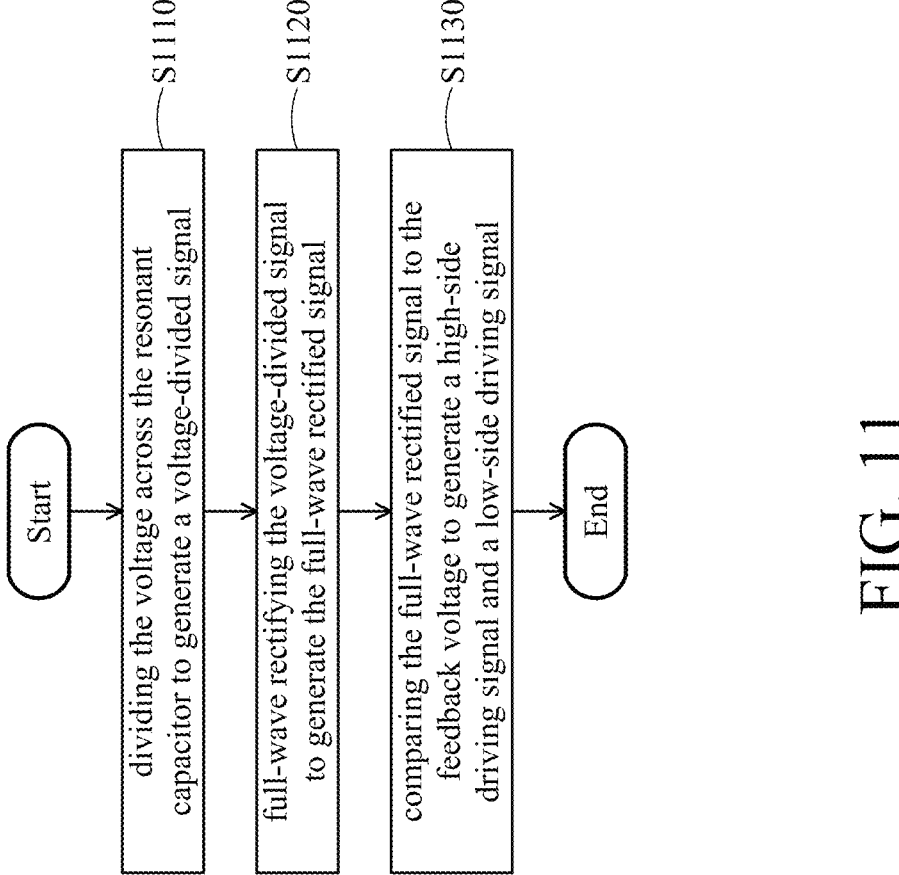
FIG. 11 is a flowchart showing a control method for controlling a resonant power converter in accordance with an embodiment of the present invention.

FIG. 11 is a flowchart showing a control method for controlling a resonant power converter in accordance with an embodiment of the present invention. The following description of the control method 1100 in FIG. 11 will be combined with the resonant power convertor 100 in FIG. 1 to facilitate detailed explanation.

First, the first voltage divider 130 is configured to divide the voltage across the resonant capacitor CR to generate a voltage-divided signal SD (step S1110). Next, the full-wave rectification device 140 is configured to full-wave rectify the voltage-divided signal SD to generate the full-wave rectified signal FW (step S1120). The full-wave rectified signal FW and the feedback voltage FB are compared to generate a high-side driving signal HS and a low-side driving signal LS for driving the high-side transistor 110 and the low-side transistor 120 respectively (step S1130). According to an embodiment of the present invention, the compensation circuit 400 in FIG. 4 is configured to limit the lower limit of the feedback voltage FB to generate the compensation voltage COMP. In step S1130, the full-wave rectified signal FW and the compensation voltage COMP are compared to generate the high-side driving signal HS and the low-side driving signal LS.

The present invention proposes a resonant power converter and a control method thereof. Through full-wave rectifying the voltage-divided signal related to the voltage cross the resonant capacitor and comparing the voltage-divided signal with the feedback voltage, the enable period of the high-side transistor can be close to that of the low-side transistor, thereby improving the conversion efficiency of the resonant power convertor.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A resonant power converter, comprising:
   a resonant capacitor, coupled between a resonant node and a ground;
   a transformer, comprising a primary coil and a secondary coil, wherein the primary coil is coupled between a switch node and the resonant node;
   a high-side transistor, providing an input voltage to the switch node based on a high-side driving signal;
   a low-side transistor, coupling the switch node to the ground based on a low-side driving signal;
   a first voltage divider, dividing a voltage of the resonant node to generate a voltage-divided signal;
   a full-wave rectification device, full-wave rectifying the voltage-divided signal to generate a full-wave rectified signal;

a control circuit, comparing the full-wave rectified signal to a feedback voltage to generate the high-side driving signal and the low-side driving signal;

a rectifying circuit, coupled to the secondary coil and converting a current flowing through the secondary coil into an output voltage; and a feedback circuit, generating the feedback voltage based on the output voltage.

2. The resonant power converter as claimed in claim 1, wherein the full-wave rectification device uses a basic voltage as a DC level and full-wave rectifies the voltage-divided signal to generate the full-wave rectified signal;

wherein the basic voltage is equal to a sum of a divided voltage and an offset voltage;

wherein the divided voltage is equal to the input voltage multiplied by a first ratio;

wherein the full-wave rectification device further compares the full-wave rectified signal with a first threshold voltage to generate a crossover signal;

wherein the first threshold voltage slightly exceeds the basic voltage.

3. The resonant power converter as claimed in claim 2, wherein when the full-wave rectified signal is less than the first threshold voltage, the full-wave rectification device sets the crossover signal to a disabled state;

wherein when the full-wave rectified signal is not less than the first threshold voltage, the full-wave rectification device sets the crossover signal to an enabled state;

wherein in response to the crossover signal changing from the disabled state to the enabled state, the control circuit sets a phase signal to the enabled state;

wherein in response to the full-wave rectified signal exceeding the feedback voltage, the control circuit sets the phase signal to the disabled state based on a high-side dead time signal or a low-side dead time signal;

wherein the high-side dead time signal controls a high-side dead time of the high-side driving signal;

wherein the low-side dead time signal controls a low-side dead time of the low-side driving signal.

4. The resonant power converter as claimed in claim 3, wherein when the high-side driving signal turns on the high-side transistor and the phase signal is in the enabled state, the control circuit disables the high-side driving signal in response to the full-wave rectified signal exceeding the feedback voltage;

wherein when the high-side signal turns off the high-side transistor, the control circuit enables the low-side driving signal to turn on the low-side transistor after the low-side dead time;

wherein when the low-side driving signal turns on the low-side transistor and the phase signal is in the enabled state, the control circuit disables the low-side driving signal in response to the full-wave rectified signal exceeding the feedback voltage;

wherein when the low-side driving signal turns off the low-side transistor, the control circuit enables the high-side driving signal to turn on the high-side transistor after the high-side dead time.

5. The resonant power converter as claimed in claim 3, wherein the control circuit further limits an enable period of the high-side driving signal and an enable period of the low-side driving signal to no greater than a maximum enable period.

6. The resonant power converter as claimed in claim 3, wherein the offset voltage is determined based on a difference between an enable period of the high-side driving signal and an enable period of the low-side driving signal;

wherein the offset voltage is configured to adjust the enable period of the high-side driving signal and the enable period of the low-side driving signal so that the enable period of the high-side driving signal is close to the enable period of the low-side driving signal.

7. The resonant power converter as claimed in claim 3, further comprising:

a second voltage divider, configured to divide the input voltage to generate the divided voltage;

wherein the full-wave rectification device comprises:

a first resistor, coupled between the divided voltage and the basic voltage, wherein a voltage across the first resistor generates the offset voltage;

a first current source, providing a first current flowing to the basic voltage; and an automatic adjustment circuit, sinking an adjustment current from the basic voltage based on the high-side driving signal, the low-side driving signal, the high-side dead time signal, and the low-side dead time signal.

8. The resonant power converter as claimed in claim 7, wherein in response to the first current exceeding the adjustment current, the offset voltage is positive and the basic voltage exceeds the divided voltage;

wherein in response to the first current being less than the adjustment current, the offset voltage is negative and the basic voltage is less than the divided voltage;

wherein in response to the first current being equal to the adjustment current, the basic voltage is equal to the divided voltage.

9. The resonant power converter as claimed in claim 7, wherein the automatic adjustment circuit comprises:

a time-to-voltage conversion circuit, configured to respectively convert an enable period of the high-side driving signal and an enable period of the low-side driving signal into a high-side enable-period voltage and a low-side enable-period voltage;

wherein the time-to-voltage conversion circuit comprises:

a second current source, providing a second current;

a first switch, providing the second current to a charge node based on the high-side driving signal or the low-side driving signal being enabled;

a second switch, coupling the charge node to the ground in the high-side dead time and the low-side dead time;

a first capacitor, coupled between the charge node and the ground;

a second capacitor, coupled between a high-side enable-period voltage and the ground;

a third capacitor, coupled between a low-side enable-period voltage and the ground;

a third switch, coupling the charge node to the high-side enable-period voltage based on the high-side driving signal being enabled; and a fourth switch, coupling the charge node to the low-side enable-period voltage based on the low-side driving signal being enabled;

wherein the high-side enable-period voltage represents the enable period of the high-side driving signal, and the low-side enable-period voltage represents the enable period of the low-side driving signal.

10. The resonant power converter as claimed in claim 9, wherein the automatic adjustment circuit further comprises:

a comparison circuit, comparing the high-side enable-period voltage to the low-side enable period to generate an up-count signal and a down-count signal;

a plurality of registers, configured to latch the up-count signal and the down-count signal in the high-side dead time and the low-side dead time;

a counter, up-counting a digital code based on the up-count signal being enabled and down-counting the digital code based on the down-count signal being enabled; and a digital-to-analog converter, generating the adjustment current based on the digital code;

wherein when the high-side enable-period voltage exceeds the low-side enable-period voltage, the comparison circuit enables the up-count signal and disables the down-count signal;

wherein when the high-side enable-period voltage does not exceed the low-side enable-period voltage, the comparison circuit disables the up-count signal and enables the down-count signal.

11. The resonant power converter as claimed in claim 7, wherein in response to the output voltage increasing, the feedback voltage decreases;

wherein in response to the feedback voltage being less than a low-power threshold voltage, a low-side dead time signal enables a burst signal, so that the control circuit operates in a burst mode based on the burst signal being enabled;

wherein when the control circuit operates in the burst mode, the high-side transistor and the low-side transistor are turned off;

wherein a duration of the burst mode increases as output power of the output voltage decreases.

12. The resonant power converter as claimed in claim 11, wherein the control circuit comprises:

a first amplifier, comprising a first positive input terminal, a first negative input terminal, and a first output terminal, wherein the first positive input terminal receives the feedback voltage, and the first negative input terminal is coupled to the first output terminal;

a second amplifier, comprising a second positive input terminal, a second input terminal, and a second output terminal, wherein the second positive input terminal receives a feedback threshold voltage;

a second resistor, coupled between the second negative input terminal and the first output terminal and generating a difference current;

an N-type transistor, comprising a gate terminal, a drain terminal, and a source terminal, wherein the gate terminal is coupled to the second output terminal and the source terminal is coupled to the second negative input terminal; and a current mirror, mapping the difference current to a mapping current;

wherein the feedback threshold voltage is a lower limit of the feedback voltage;

wherein the mapping current is configured to adjust the duration.

13. A control method configured to control a resonant power converter, wherein the resonant power converter comprises a resonant capacitor coupled between a resonant node and a ground, a transformer comprising a primary coil and a secondary coil, a high-side transistor providing an input voltage to a switch node, a low-side transistor coupling the switch node to the ground, a rectifying circuit converting a current flowing through the secondary coil into an output voltage, and a feedback circuit generating a feedback voltage based on the output voltage, wherein the primary coil is coupled between the switch node and the resonant node, wherein the control method comprises:

dividing a voltage across the resonant capacitor to generate a voltage-divided signal by using a first voltage divider;

full-wave rectifying the voltage-divided signal to generate a rectified a full-wave rectified signal; and comparing the full-wave rectified signal with the feedback voltage to drive the high-side transistor and the low-side transistor.

14. The control method as claimed in claim 13, further comprising:

full-wave rectifying the voltage-divided signal with a basic voltage as a DC level to generate the full-wave rectified signal; and comparing the full-wave rectified signal with a first threshold voltage to generate a crossover signal;

wherein the basic voltage is equal to a sum of a divided voltage and an offset voltage;

wherein the divided voltage is equal to the input voltage multiplied by a first ratio;

wherein the first threshold voltage is slightly greater than the basic voltage.

15. The control method as claimed in claim 14, further comprising:

when the full-wave rectified signal is less than the first threshold voltage, setting the crossover signal to a disabled state;

when the full-wave rectified signal is not less than the first threshold voltage, setting the crossover signal to an enabled state;

in response to the crossover signal changing from the disabled state to the enabled state, setting a phase signal to the enabled state; and in response to the full-wave rectified signal exceeding the feedback voltage, setting the phase signal to the disabled state in a high-side dead time or a low-side dead time;

wherein the low-side dead time is a period between a point at which the high-side transistor is turned off and a point at which the low-side transistor is turned on;

wherein the high-side dead time is a period between a point at which the low-side transistor is turned off and a point at which the high-side transistor is turned on.

16. The control method as claimed in claim 15, further comprising:

when the high-side transistor is turned on and the phase signal is in the enabled state, turning off the high-side transistor in response to the full-wave rectified signal exceeding the feedback voltage;

when the high-side transistor is turned off, turning on the low-side transistor after the low-side dead time;

when the low-side transistor is turned on and the phase signal is in the enabled state, turning off the low-side transistor in response to the full-wave rectified signal exceeding the feedback voltage; and when the low-side transistor is turned off, turning on the high-side transistor after the high-side dead time.

17. The control method as claimed in claim 15, further comprising:

limiting an enable period of the high-side transistor and an enable period of the low-side transistor so as not to exceed a maximum enable period.

18. The control method as claimed in claim 15, further comprising:

determining the offset voltage based on a difference between an enable period of the high-side transistor and an enable period of the low-side transistor;

wherein the offset voltage is configured to adjust the enable period of the high-side transistor and the enable period of the low-side transistor so that the enable period of the high-side transistor is close to the enable period of the low-side transistor.

19. The control method as claimed in claim 15, further comprising:

generating the offset voltage by using a voltage across a first resistor, wherein the first resistor is coupled between the divided voltage and the basic voltage;

providing a first current flowing to the basic voltage;

sinking an adjustment current from the basic voltage based on the high-side transistor and the low-side transistor being turned on and off, the high-side dead time, and the low-side dead time by using an automatic adjustment circuit;

wherein the offset voltage is positive and the basic voltage exceeds the divided voltage in response to the first current exceeding the adjustment current;

wherein the offset voltage is negative and the basic voltage does not exceed the divided voltage in response to the first current not exceeding the adjustment current;

wherein the first current is equal to the adjustment current, and the basic voltage is equal to the divided voltage.

20. The control method as claimed in claim 19, wherein the step of sinking the adjustment current from the basic voltage based on the high-side transistor and the low-side transistor being turned on and off, the high-side dead time, and the low-side dead time by using the automatic adjustment circuit further comprises:

converting an enable period of the high-side transistor into a high-side enable-period voltage by using a time-to-voltage conversion circuit;

converting an enable period of the low-side transistor into a low-side enable-period voltage by using the time-to-voltage conversion circuit;

comparing the high-side enable-period voltage and the low-side enable-period voltage to generate an up-count signal and a down-count signal;

when the high-side enable-period voltage exceeds the low-side enable-period voltage, increasing the adjustment voltage; and when the high-side enable-period voltage does not exceed the low-side enable-period voltage, decreasing the adjustment voltage.

21. The control method as claimed in claim 19, further comprising:

in response to the feedback voltage being less than a low-power threshold voltage, operating in a burst mode, wherein the feedback voltage decreases as the output voltage increases;

simultaneously turning off the high-side transistor and the low-side transistor in the burst mode; and increasing a duration of the burst mode in response to output power of the output voltage decreasing.

22. The control method as claimed in claim 21, further comprising:

limiting the feedback voltage so as not to exceed a feedback threshold voltage;

generating a difference current by using a second resistor, the feedback voltage, and the feedback threshold voltage;

mapping the difference current to a mapping current; and adjusting the duration by using the mapping current.

* * * * *